United States Patent
Shor et al.

(10) Patent No.: US 10,342,032 B2
(45) Date of Patent: *Jul. 2, 2019

(54) METHOD AND DEVICE FOR STREAMING CONTROL DATA IN A MOBILE COMMUNICATION SYSTEM

(71) Applicants: Roy Shor, Tel-Aviv (IL); Ori Goren, Kibutz Ruchama (IL); Avraham Horn, Givat Shmuel (IL); Yael Kahil, Rannana (IL); Shay Shpritz, Hod Hasharon (IL)

(72) Inventors: Roy Shor, Tel-Aviv (IL); Ori Goren, Kibutz Ruchama (IL); Avraham Horn, Givat Shmuel (IL); Yael Kahil, Rannana (IL); Shay Shpritz, Hod Hasharon (IL)

(73) Assignee: NXP USA, Inc., Austin, TX (US)

(*) Notice: Subject to any disclaimer, the term of this patent is extended or adjusted under 35 U.S.C. 154(b) by 274 days.

This patent is subject to a terminal disclaimer.

(21) Appl. No.: 14/899,137

(22) PCT Filed: Jul. 4, 2013

(86) PCT No.: PCT/IB2013/055472
§ 371 (c)(1),
(2) Date: Dec. 17, 2015

(87) PCT Pub. No.: WO2015/001389
PCT Pub. Date: Jan. 8, 2015

(65) Prior Publication Data
US 2016/0150558 A1    May 26, 2016

(51) Int. Cl.
*H04W 72/12* (2009.01)
*H04W 88/08* (2009.01)
*H04L 12/721* (2013.01)

(52) U.S. Cl.
CPC ......... *H04W 72/1263* (2013.01); *H04L 45/66* (2013.01); *H04W 88/085* (2013.01)

(58) Field of Classification Search
None
See application file for complete search history.

(56) References Cited

U.S. PATENT DOCUMENTS

| | | | |
|---|---|---|---|
| 4,200,930 A * | 4/1980 | Rawlings | G06F 13/385 709/212 |
| 4,263,647 A | 4/1981 | Merrell et al. | |

(Continued)

OTHER PUBLICATIONS

International Search Report and Written Opinion correlating to PCT/IB2013/055472 dated Mar. 21, 2014.

(Continued)

*Primary Examiner* — Andrew C Oh (57) ABSTRACT

Interfacing between radio units in a base station in a mobile communication system uses a common public radio interface CPRI for streaming IQ data samples and control data arranged in lanes. A separate serial interface sRIO is now additionally used for transferring selected control data arranged in packets to a controller, the selected control data being streamed between other radio units via the common public radio interface. In the radio unit, the selected control data are arranged in packets to be transmitted via the serial interface, and, vice versa, the selected control data arranged in packets received via the serial interface are arranged in lanes to be streamed. Advantageously the control data of the streaming CPRI interface is seamlessly transferred to the controller via the packet based serial interface.

17 Claims, 9 Drawing Sheets

(56) References Cited

U.S. PATENT DOCUMENTS

| | | | |
|---|---|---|---|
| 5,487,181 A | 1/1996 | Dailey et al. | |
| 5,642,350 A * | 6/1997 | Dailey | G06F 13/4286 370/439 |
| 5,991,817 A | 11/1999 | Rowett et al. | |
| 6,278,921 B1 | 8/2001 | Harrison et al. | |
| 6,304,911 B1 | 10/2001 | Brcich et al. | |
| 6,934,301 B2 | 8/2005 | Jordan | |
| 7,831,745 B1 * | 11/2010 | Eiriksson | G06F 13/28 710/22 |
| 8,908,650 B2 * | 12/2014 | Aarflot | H04J 3/0682 370/248 |
| 2003/0182484 A1 | 9/2003 | Gaur et al. | |
| 2003/0200372 A1 | 10/2003 | Doragh et al. | |
| 2004/0120339 A1 | 6/2004 | Ronciak | |
| 2004/0236930 A1 | 11/2004 | Diepstraten et al. | |
| 2005/0135412 A1 * | 6/2005 | Fan | H04L 69/16 370/463 |
| 2005/0188129 A1 * | 8/2005 | Abdelilah | G06F 13/28 710/52 |
| 2007/0101035 A1 | 5/2007 | Son et al. | |
| 2007/0101036 A1 | 5/2007 | Son et al. | |
| 2007/0143579 A1 * | 6/2007 | Shih | G06F 9/3001 712/200 |
| 2007/0171866 A1 | 7/2007 | Merz et al. | |
| 2008/0089689 A1 * | 4/2008 | Sakama | H04W 88/085 398/115 |
| 2008/0181245 A1 | 7/2008 | Basso et al. | |
| 2009/0016217 A1 * | 1/2009 | Kashyap | H04L 47/2408 370/231 |
| 2009/0216917 A1 | 8/2009 | Shasha et al. | |
| 2009/0291681 A1 * | 11/2009 | Hara | H04W 88/085 455/422.1 |
| 2009/0323710 A1 | 12/2009 | Shahar et al. | |
| 2010/0064069 A1 | 3/2010 | Shasha et al. | |
| 2010/0106874 A1 | 4/2010 | Dominguez et al. | |
| 2011/0032910 A1 * | 2/2011 | Aarflot | H04J 3/0682 370/335 |
| 2011/0050618 A1 * | 3/2011 | Murphy | G06F 1/3215 345/174 |
| 2011/0075616 A1 | 3/2011 | Baldwin et al. | |
| 2011/0080283 A1 * | 4/2011 | Schweitzer, III | G01R 31/085 340/539.26 |
| 2011/0117901 A1 | 5/2011 | Li et al. | |
| 2011/0138096 A1 | 6/2011 | Radulescu et al. | |
| 2011/0164624 A1 * | 7/2011 | Kelleher | H04B 1/40 370/475 |
| 2011/0170577 A1 | 7/2011 | Anvari | |
| 2012/0009977 A1 | 1/2012 | Yu et al. | |
| 2012/0057572 A1 * | 3/2012 | Evans | H04W 88/085 370/338 |
| 2012/0113972 A1 | 5/2012 | Liu et al. | |
| 2012/0151537 A1 * | 6/2012 | Singh | H04L 65/607 725/81 |
| 2012/0311411 A1 | 12/2012 | Kirkpatrick | |
| 2013/0051329 A1 * | 2/2013 | Take | H04W 80/02 370/328 |
| 2013/0163524 A1 | 6/2013 | Shatzkamer et al. | |
| 2013/0237161 A1 | 9/2013 | Zhao et al. | |
| 2013/0294419 A1 | 11/2013 | Heiser et al. | |
| 2013/0326252 A1 | 12/2013 | Ise et al. | |
| 2014/0094157 A1 * | 4/2014 | Nguyen | H04W 88/085 455/418 |
| 2014/0198684 A1 * | 7/2014 | Gravely | H04W 24/02 370/254 |
| 2014/0317220 A1 * | 10/2014 | Karlsson | H04L 49/356 709/212 |
| 2015/0117861 A1 * | 4/2015 | Ponzini | H04B 10/2575 398/79 |
| 2015/0347332 A1 * | 12/2015 | Shor | G06F 13/287 710/308 |
| 2015/0372930 A1 | 12/2015 | Shor et al. | |
| 2016/0037580 A1 * | 2/2016 | Shor | H04W 88/085 370/328 |
| 2016/0142458 A1 * | 5/2016 | Shor | H04L 65/60 370/312 |

OTHER PUBLICATIONS

CPRI Specification V5.0, "Common Public Radio Interface (CPRI); Interface Specification", Sep. 21, 2011, pp. 1-119.

Fact sheet B4860 "QorIQ Qonverge B4860 Baseband Processor" by Freescale.

"Next-Generation Wireless Network Bandwidth and Capacity Enabled by Heterogeneous and Distributed Networks" White Paper by Freescale.

RapidIO™ Interconnect Specification, Rev. 2.1, Aug. 2009, RapidIO Trade Association.

Non-Final Office Action for U.S. Appl. No. 14/899,132 dated May 4, 2017, 15 pages.

Final Office Action for U.S. Appl. No. 14/899,132 dated Jul. 31, 2017, 19 pages.

Notice of Allowance dated May 21, 2018 for U.S. Appl. No. 14/899,132, 12 pages.

Notice of Allowance dated Mar. 13, 2019 for U.S. Appl. No. 14/899,132; 11 pages.

* cited by examiner

METHOD AND DEVICE FOR STREAMING CONTROL DATA IN A MOBILE COMMUNICATION SYSTEM

FIELD OF THE INVENTION

This invention relates to data streaming in a base station in a mobile communication system. An example of a mobile communication system is a fourth generation (4G) cell based mobile communication system such as LTE system (Long Term Evolution, which is the most recent step forward from cellular 3G services) or the Wideband Code Division Multiple Access (W-CDMA) system.

An overview of such communication systems can be found in the white paper "Next-Generation Wireless Network Bandwidth and Capacity Enabled by Heterogeneous and Distributed Networks" by Freescale, which company also provides processors for such systems such as B4860 "QorIQ Qonverge B4860 Baseband Processor". This processor targets macro cell base station designs for broadband wireless infrastructure and has four 64 bit, dual-threaded processor cores, six 16 bit 32GMAC/cycle calculation cores and baseband acceleration processing engines. It is designed to adapt to the rapidly changing and expanding standards of LTE (FDD and TDD), LTE-Advanced and WCDMA and supports different standards simultaneously. Technical data for the B4860 processor is available via http://www.freescale.com/webapp/sps/site/prod summary.jsp?code=B4860.

The invention concerns interfacing in the base station, which the base station comprises radio units and at least one controller unit for controlling the radio units, different types of radio units including at least one radio equipment unit coupled to at least one antenna and at least one radio equipment controller unit for controlling the radio equipment unit. Such radio units have, for interfacing between units, a common public radio interface according to a common public radio interface standard for streaming data samples and control data arranged in lanes corresponding to antenna signals. Multiple radio equipment controller units and/or radio equipment units may be coupled in a chain, while such a chained unit may process part of the data samples and/or control data and forward a further part to a subsequent unit. The last unit in the chain may exchange control data with a preceding unit and locally process all data samples. In this context processing in the radio equipment unit involves converting the data samples into antenna signals and vice versa, whereas processing data samples in the radio controller unit may involve converting data payload to be communicated into IQ data samples representing modulated antenna signals, and vice versa. As such, said processing in the units in the base station is well known.

BACKGROUND OF THE INVENTION

In cell based mobile communication systems base stations are provided to communicate with the mobile devices. Such base stations usually have a high frequency radio part, called Radio Equipment (RE), coupled to an antenna for exchanging radio signals with the mobile devices, which RE is controlled by a further part called Radio Equipment Controller (REC). The REC may be located in the base-station cabinet, while the RE is usually located near the antennas. An interface between both parts has been standardized, and is called Common Public Radio Interface (CPRI).

The standard "Common Public Radio Interface (CPRI); Interface Specification V5.0 (2011-09-21)", as provided on http://www.cpri.info, describes an example of the interface, abbreviated as CPRI. The CPRI configuration may have multiple Radio Equipment Controllers (REC) and/or multiple Radio Equipments (RE) connected point to point in a chain network using very high frequencies (up to 9.8 GHz) for streaming interfacing. Data samples are received at the RE and interfaced to the REC via an IQ data link called a lane, in a data format based on the I and Q components of the modulated signal. Besides IQ data link, CPRI supports further types of communication and management (C&M) data: a Vendor Specific ("VSS") channel, a HDLC ("slow C&M channel") and an Ethernet link ("fast C&M channel").

Figure 1:
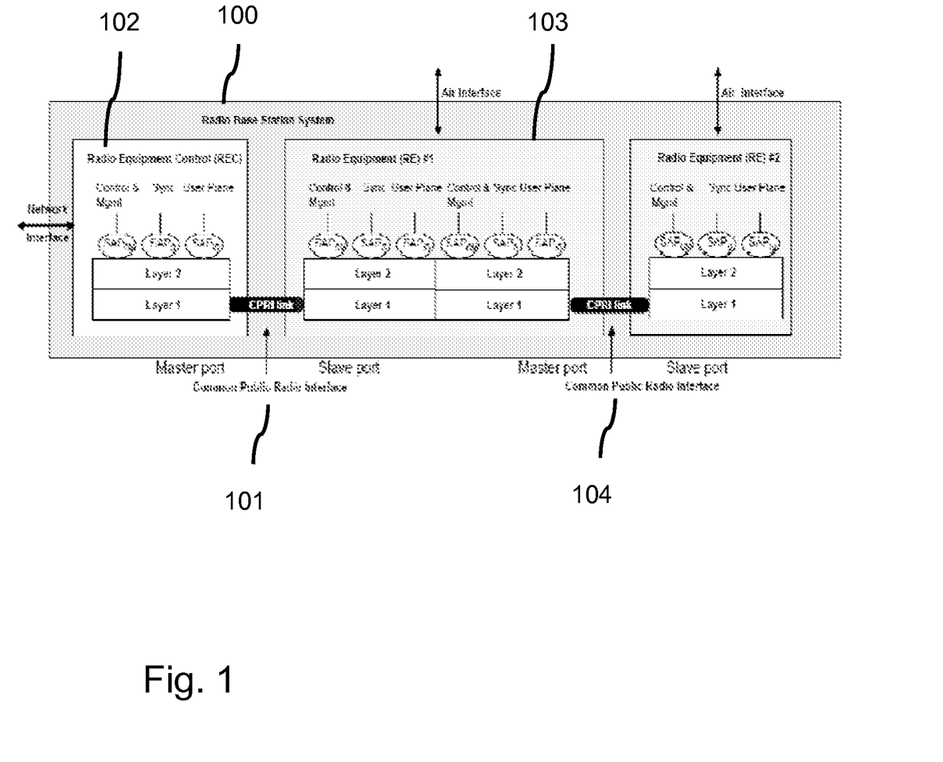
FIG. 1 shows an example of CPRI connectivity.

FIG. 1 shows an example of CPRI connectivity. The Figure shows an example of a base station architecture 100 comprising a CPRI interface 101 between a REC 102 and an RE 103. A further CPRI interface 104 may be provided to interconnect multiple RECs in a chain. As such, the CPRI interface is described in the CPRI V5 and chapter 2 describes the CPRI related parts of the basic radio base station system architecture. The Figure is taken from chapter 2 (see CPRI V5, FIGS. 2 and 2A on page 10) and is further described in chapter 2.2 System Architecture of the CPRI standard.

It is noted that, in large base stations, multiple lanes of I,Q data samples may be used between RE and REC, and between REC and subsequent RECs in the chain. Each REC may locally process data samples of some lanes, and pass samples of other lanes to further RECs. However, the number of lanes for an individual REC is limited, and a substantial part of said lanes may be required to connect to the RE. Hence a limit for the number of useable lanes depends on the actual number of lanes that the first REC in said chain has available, which limit may be unduly restrict extending the base station to handle larger numbers of lanes from the RE. Similar problems may apply to a chain of REs. Furthermore, control data is transferred between units via the lanes of the common public radio interface.

SUMMARY OF THE INVENTION

The present invention provides an interfacing method and devices, and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

In the Figures, elements which correspond to elements already described may have the same reference numerals.

DETAILED DESCRIPTION OF THE PREFERRED EMBODIMENTS

For the radio units as described in the introduction, current devices in chips for baseband processing (also called Layer 1 processing) support chaining of multiple units via a common public radio interface according to a common public radio interface standard (CPRI). The connection for data samples and control data between the RE and REC can be through the streaming CPRI interface. Separate controllers may be added to such a chain and may be coupled via a further serial interface. For example, a separate controller may further be connected to the primary REC through a serial interface for transferring control data in packets, such as the high speed serial Rapid Input Output (sRIO) interface. Radio equipment units (RE) and further REC units may be chained, and may also have the additional serial interface separate from the CPRI. It is noted that although CPRI and sRIO are used as examples for elucidating the proposed system below having both a streaming interface and a separate packet based serial interface, other data streaming interfaces and/or packet based serial interfaces may also be used. For example PCI Express is a well known example of such a packet based serial interface.

CPRI is a data streaming protocol via a dedicated interface, where one lane per controller may be running in link rates of up to 9.8304 Gbaud. About 94% of the frames are used to transfer the IQ data samples, while the remaining frames are available mainly for control and management data (C&M), for example formatted according to the well known Ethernet or HDLC protocol. The Ethernet bit rate may be up 337.92 Mbps at the link rate 9.8304 GBaud, while the HDLC bit rate may be up to 7.68 Mbps at link rate 9.8304 GBaud.

sRIO is a packet based protocol using a serial interface providing data communication between sRIO controllers using link rates of up to 5 Gbaud. Packets are processed according to a command in the heading (WRITE, READ, etc). In the RX direction the packets are received by a sRIO controller and depending on the command the packet data is processed or read/written from/to a memory by the serial interface controller. In the TX direction the packets may be prepared in a memory and a DMA unit may be programmed to deliver them to the sRIO controller for transmission. The sRIO architecture is a high-performance packet-switched, interconnect technology for interconnecting chips on a circuit board, and also circuit boards to each other using a backplane. It may also be used to connect racks with cabling. Further information and a specification "RapidIO Interconnect Specification, Rev 2.1 August 2009" is available via http://www.rapidio.org.

Figure 2:
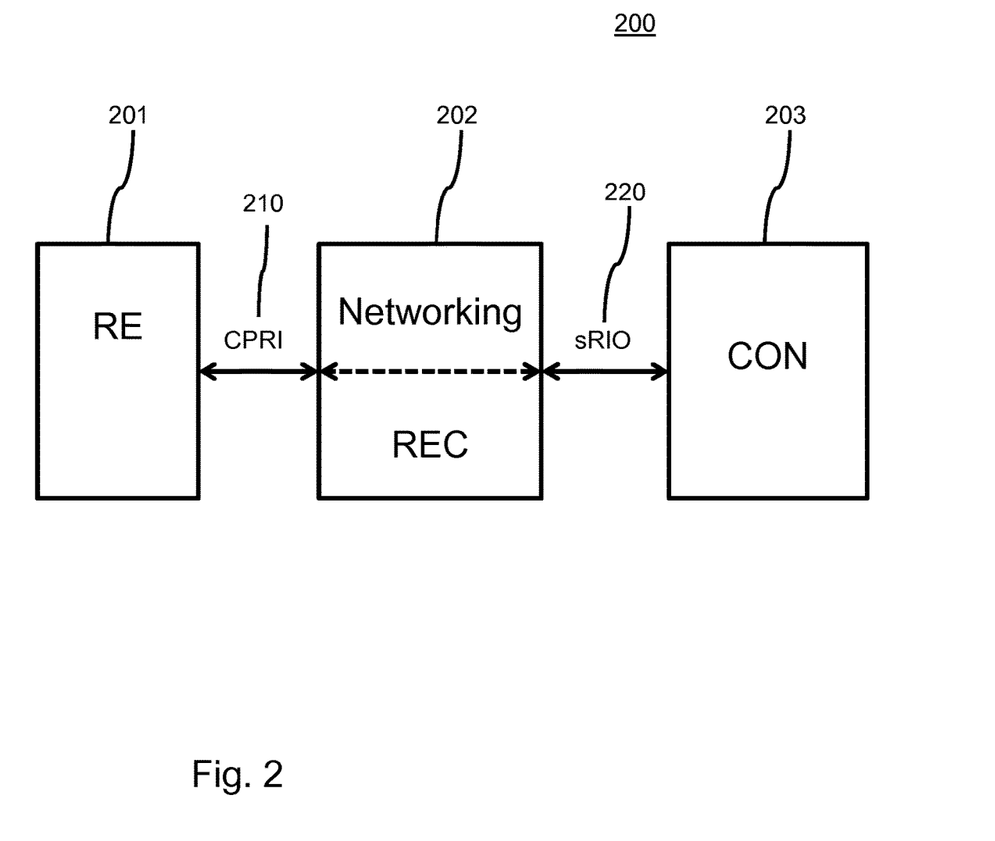
FIG. 2 shows an example of interfacing between units in a base station.

FIG. 2 shows an example of interfacing between units in a base station. The base station 200 has a radio equipment unit RE 201, a first radio equipment controller unit REC 202, which is named networking REC due to being coupled in a chain to a subsequent controller called CON 203 due to it being the controller unit in the chain. The RE 201 is coupled to the first REC 202 via a common public radio interface 210 according to a common public radio interface standard (CPRI) as indicate by an arrow representing one or more lanes corresponding to antenna signals for streaming data samples (IQ). A lane corresponds to a physical connection, e.g. one cable via one connector, so a lane means a physical connection between two radio units Furthermore, both the networking REC and the controller CON have a separate serial interface 220, for example the serial rapid Input Output (sRIO) interface, which provides a packet based interface. It is noted that the controller may be a dedicated controller, or a further Radio Equipment Controller unit.

It is noted that in unit REC 202 (in the middle of FIG. 2), there is baseband signal processing called Layer one processing, which is connected to control processing called Layer two processing. Layer two processes control and management data which may be transferred via the common public radio interface, whereas Layer two cannot directly connect via CPRI as it does NOT have direct access to the relevant interface. The proposed interfacing provides, for selected control data, a seamless connection between the common public radio interface and the serial interface for transferring control and management data between the common public radio interface and controller devices coupled via the serial interface, which is further described below.

Figure 3:
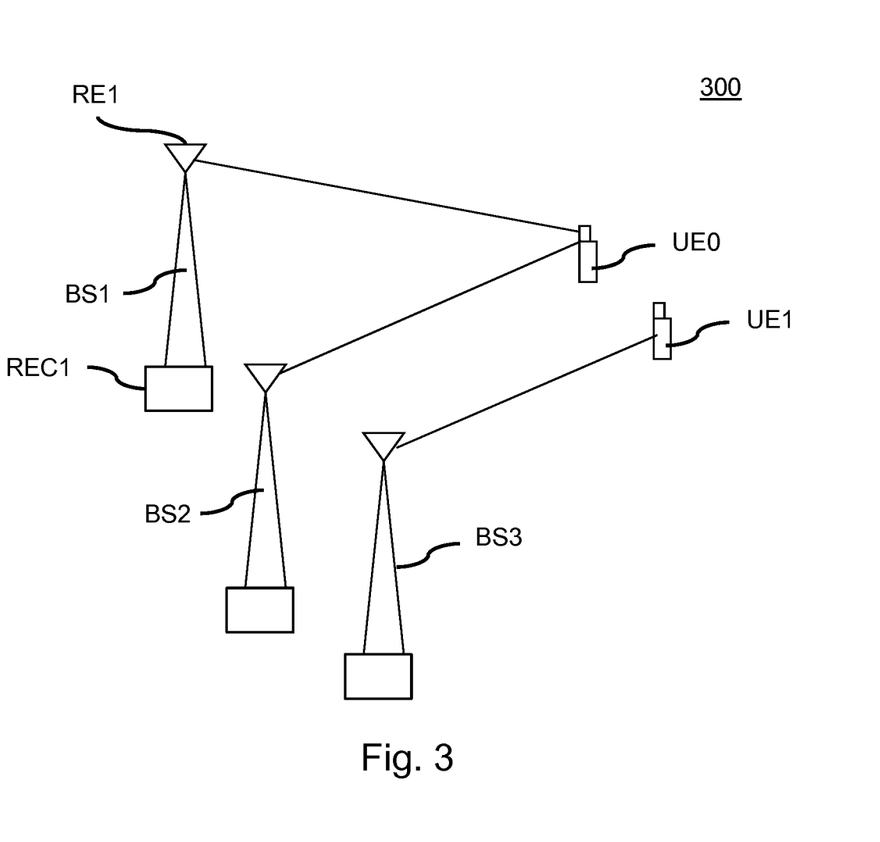
FIG. 3 shows an example of an overview of a mobile communication system.

FIG. 3 shows an example of an overview of a mobile communication system. In the example, the mobile communication system 300 has three base stations BS1, BS2, BS3 and two mobile devices, called user equipment UE0, UE1. The first user equipment UE0 is shown to communicate with two base stations BS1 and BS2, e.g. in a communication handover process, and the other user equipment UE1 is shown to communication with BS3. In the base station BS1 radio unit RE1, is coupled to an antenna for radio transmitting and receiving. The radio unit RE1 is coupled to a radio controller unit REC1 for providing transmission data and control information to the radio unit RE1.

The radio equipment unit RE1 and radio equipment controller unit REC 1 in the base station BS1 in the mobile communication system 300 are connected via an interface. Thereto, the radio controller equipment unit has a common public radio interface according to a common public radio interface standard, for example CPRI, and the radio equipment unit RE1 also has the common public radio interface.

In the base station, multiple REC and/or multiple RE radio units may be coupled in a chain for streaming data samples. Control data is also streamed via the common public radio interface. Adding lanes to all radio units and controller units may enhance connectivity, but requires replacements by more expensive units, which may not be available or may be too bulky to install. Hence there may be a need to have radio and controller units that provide flexible control data interfacing capacity. Instead of adding further streaming data interfacing capacity, the following is proposed.

For a system where a RE and a primary REC are connected through a CPRI interface while a controller CON and the primary REC are connected via sRIO, transferring control and management data from/to the antenna (i.e. RE) to/from the primary controller is needed. According to the CPRI standard transferring Ethernet data can get up to >200 Mbps. Control data may be streamed via the CPRI via the Control and Management channel according to a predetermined protocol, e.g. Ethernet or HDLC. However, control data streamed at such rates may create a heavy interrupt load on a core processor serving the interrupts. Traditionally no alternative exists for transferring data of the Control and Management channel.

The proposed system of interfacing is to enable control and management traffic to seamlessly bypass the REC device from common public radio interface (CPRI) to the separate serial interface (sRIO) and vice versa. It enables new system connectivity where a radio unit is connected to the REC via a common public radio interface while being connected to a controller unit or further radio unit via sRIO.

For accommodating a requirement to share the control data between an REC and a controller, or between different RECs or REs, e.g. in the situation the lane capacity between the RE and the REC may be insufficient or cause too much interrupt handling, the sRIO channel is adapted to be used as a chain interfacing capability by converting selected control data streaming via the common public radio interface to packets to be transferred via the separate serial interface. So the idea is to enable control data to be seamlessly forwarded by the REC device from the CPRI interface to sRIO interface and vice versa. Using the sRIO channel to enhance a daisy chain topology of radio units enables additional system connectivity for control data streamed on the common public radio interface.

In view of the above, interfacing in a base station in the mobile communication system 300 is proposed. The base station has radio units of different types including at least one radio equipment unit RE1 coupled to at least one antenna and at least one radio equipment controller unit REC1 for controlling the radio equipment unit. The radio units have a common public radio interface according to a common public radio interface standard (CPRI) for streaming data samples (IQ) arranged in lanes corresponding to antenna signals. Furthermore, the radio units have a serial interface for transferring packets separate from the common public radio interface.

The interfacing method in the base station involves transferring, between a first and further unit, selected control data arranged in packets via the serial interface. The interfacing involves receiving the selected control data formatted according to a predetermined protocol via the common public radio interface, transmitting the packets having the selected control data via the serial interface, and, vice versa, receiving the packets having the selected control data via the serial interface, and transmitting the selected control data formatted according to a predetermined protocol via the common public radio interface. The selected control data corresponds to control data streamed between the first radio unit and a preceding radio unit via the common public radio interface. Such selecting may be configured when installing the system, or may be predetermined by the manufacturer of the radio units or semiconductor devices used in such radio units. For example, control data may contain a target address, and specific addresses or a range of addresses may be selected to be transferred via the separate serial interface, while other control data for other addresses is conventionally transferred via the streamed common public radio interface.

In the above first radio unit, the selected control data to be transmitted via the serial interface are arranging in packets, and, vice versa, the selected control data arranged in packets received via the serial interface are arranged in lanes for further streaming via the common public radio interface.

Furthermore, in the above further unit, the selected control data arranged in packets received via the serial interface is processed, and, vice versa, the selected control data to be transmitted via the serial interface are arranged in packets. For example, the further unit may be a controller for controlling other radio units via CPRI control and management data, which is transmitted and received via the serial interface, but converted to the CPRI streaming interface by a connected radio unit as described above.

Optionally, said arranging in packets comprises retrieving a target address from the control data formatted on the common public radio interface according to a predetermined protocol. Subsequently, the target address may be matched to a target destination on the serial interface for selecting the control data. If control data is selected, the packet having the selected control data is transmitted via the serial interface, the packet comprising the target address.

A device for use in the radio unit as defined above has a common public radio interface according to a common public radio interface standard (CPRI) for streaming data samples (IQ) and control data arranged in lanes corresponding to antenna signals and a serial interface for transferring packets separate from the common public radio interface. As further elucidated with FIGS. 4 and 5 below, the device has a data handler for the above described interfacing. The device is configured for transferring, between the device and a subsequent radio unit, selected control data arranged in packets via the serial interface, the selected control data corresponding to control data streamed between the device and a preceding radio unit via the common public radio interface and not streamed between the device and the subsequent radio unit via the common public radio interface. The device has a data handler configured for arranging in packets the selected control data to be transmitted via the serial interface, and, vice versa, arranging in lanes the selected control data received via the serial interface.

Optionally, the data handler is configured for said arranging in packets by retrieving a target address from the control data formatted on the common public radio interface according to a predetermined protocol, matching the target address to a target destination on the serial interface for selecting the control data, and, if selected, transmitting the packet having the selected control data via the serial interface, the packet comprising the target address. Effectively, the selecting of control data and routing of the selected control data is based on the available target addresses.

Optionally, the data handler is configured for said arranging in packets by storing the selected control data in the memory according to a buffer descriptor (BD) and for retrieving the selected control data from the memory to the serial interface according to the buffer descriptor. The buffer descriptor defines an amount of memory space that stores the selected control data. The selected control data is stored and retrieved according to the buffer descriptor.

Optionally, the data handler is configured for maintaining a ring memory for storing buffer descriptors for respective data buffers, the sequence of stored buffer descriptors in the ring memory corresponding to sets of control data to be transferred as packets. The sequence of stored buffer descriptors in the ring memory corresponds to sets of control data to be transferred as packets. A BD ring is a memory location in the system memory where the BDs are stored one after the other in a "ring" manner. Operationally, transferring in BD mode means that the BDs are used in order to transmit corresponding packets. Furthermore, the device may be arranged for preparing the ring memory by creating a number of empty buffer descriptors for receiving the selected control data from the common public radio interface. By the empty BD a memory space is reserved for receiving arriving control data after selection.

Optionally, the device comprises a direct memory access unit for directly accessing data a memory. The direct memory access unit may be configured for transferring the selected control data from the memory to the serial interface according to the buffer descriptor (BD). The BD contains information on a packet like size and location. The data handler may be configured for storing selected control data in the memory according to a buffer descriptor and providing the buffer descriptor to the direct memory access unit, and the direct memory access unit may be configured for transferring the selected control data from the memory to the serial interface according to the buffer descriptor or, vice versa, transferring the selected control data from the serial interface to the memory.

Optionally, the above device has a data processor for processing the data samples. Also the data handler may be configured for transferring, to the processor, data samples arranged in lanes, the lanes being streamed between the device and a preceding radio unit via the common public radio interface. So data samples of the lanes are processed locally in the respective radio unit, whereas further data samples may be bypassed to a next radio unit.

Optionally, the data handler is configured for said arranging in lanes by retrieving from the packets received via the serial interface a target address, matching the target address to a target destination on the common public radio interface for selecting the control data, and, if selected, transmitting the selected control data via a respective lane determined according to the target address and formatted on the common public radio interface according to a predetermined protocol. Alternatively, or additionally, the data handler may be arranged for maintaining a local unit address as the target destination address and, if the target address matches the local unit address, locally processing the selected control data. Furthermore. the target address may be a Media Access Control (MAC) address, well know as such.

Optionally, the data handler is arranged for transferring a predetermined amount of the selected control data arranged in packets via the serial interface, and for generating and transferring via the serial interface an interrupt packet after transferring said predetermined amount. Also, the device may be arranged for receiving an interrupt packet indicative of transferring, by a preceding radio unit, a predetermined amount of the selected control data arranged in packets via the serial interface, and may have an interrupt unit for, upon receiving the interrupt packet, triggering further processing of the selected control data. Advantageously, via the interrupt packet, a connected radio unit may synchronize processing the control data.

Optionally, the device is configured for transferring data samples of N lanes to the preceding radio unit via the common public radio interface, and the device is arranged for receiving an interrupt packet indicative of transferring, by the preceding radio unit, the selected control data corresponding to a predetermined amount of the data samples of the N lanes. The device may have an interrupt unit for, upon receiving the interrupt packet triggering further processing of the selected control data. Advantageously, via the interrupt packet, a connected radio unit may synchronize processing the control data to a period of the data signal or an amount of data samples of the N lanes. For example, the interrupt packet may be recognized by a packet handler based on an indicator qualifying the interrupt packet. A special interrupt register may be written by the packet handler for generating a hardware interrupt, e.g. for a core processor, so as to start further processing. It is noted that such interrupt packets may be assigned a more specific or different condition, e.g. all samples of all lanes up to some instant having been transferred, while also indicating said instant. Various interrupt packets may effectively be applied for synchronizing the processing of data samples in a chain of radio units.

Optionally, the serial interface has a serial interface controller arranged for formatting control data in packets to be transmitted, and for retrieving control data from packets as received. The serial interface may be according to the Serial Rapid Input Output standard, or the Peripheral Component Interconnect Express standard. The serial interface controller may be implemented at least partially in hardware circuits, so as to enable fast handling and (de)formatting of the packets. Formatting may include inserting in a packet a predetermined amount of the control data received via streaming, while including header data to indicate the type of packet and/or the type of data in the packet, such as a reference to the lane that carries data samples corresponding to the control data. Furthermore, the serial interface may be a serial interface according to a predetermined standard. The predetermined standard may, for example, be the Serial Rapid Input Output (sRIO) standard, or the Peripheral Component Interconnect Express (PI express) standard.

The above mentioned device, having one or more of said options, may be embodied in an integrated circuit, or in a module having hardware circuitry. Programmable elements may be used, such as FGPA, and various functions may be implemented by software or firmware stored in a program memory and executed in a processor, e.g. a core processor. Further examples of detailed embodiments are described below. Furthermore, the device may be used in a radio equipment controller unit (REC, 202) for a base station (BS) in a mobile communication system, or in a radio equipment unit (RE) for a base station (BS) in a mobile communication system.

Figure 4:
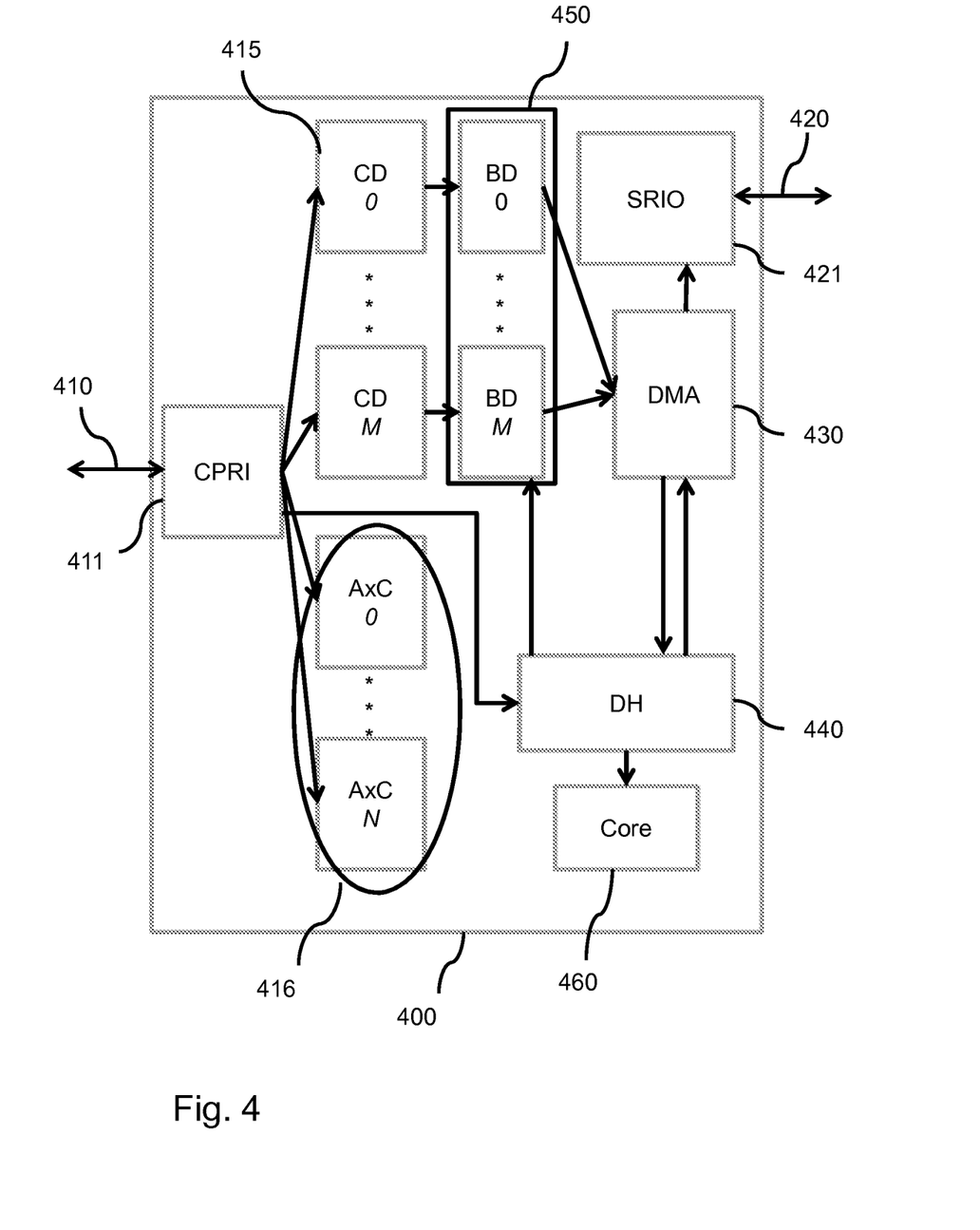
FIG. 4 shows an example of an uplink data flow in a device for a radio unit in a networking setup.

FIG. 4 shows an example of an uplink data flow in a device for a radio unit in a networking setup. The device 400 may be used in an REC or RE as described above, and active parts are shown for elucidating the uplink data flow in a chain of radio units; the device being in an intermediate networking position in the chain, i.e. coupled to a CPRI interface on one side and coupled to a combination of a common public radio interface and a separate serial interface on the other side. In the example the device 400 has a CPRI controller 411 providing a common public radio interface CPRI 410 for streaming data samples and control data as indicated by an arrow to a radio equipment unit RE (not shown as such). It is noted that the CPRI controller may support further lanes that are coupled to further radio unit, e.g. a subsequent REC in a chain or an end-point REC, or a further RE. Also, the device has a serial interface controller 421 providing a separate serial interface SRIO 420 for exchanging packets with said further radio unit as indicated by an arrow. The device may have a direct memory access unit DMA 430 for directly accessing a memory and performing data transfers between the memory and further circuits, such as the serial interface controller 421 and a buffer descriptor ring memory 450. The device further has a data handler DH 440 coupled to the direct memory access unit and the CPRI interface, and the buffer descriptor ring memory. The data handler controls the handling of the control data via the CPRI and the separate serial interface, and may cooperate with a core processor 460. The data handler may also be implemented in a processor and embedded software.

In the device, the data handler is arranged for configuring the CPRI to select control data that are to be converted from streaming control data, and to control the serial controller so as to transfer the packets via the serial interface. The data handler so generates an uplink flow of control data packets to the subsequent radio unit, e.g. an end-point radio unit shown in FIG. 5. The selected control data 415, named CD_0 to CD_M for one or more target destinations are shown to be stored according to 0 to M buffer descriptors BDn. A number of data units of antenna-carrier data named A×Cn for lane n, as indicated by an ellipse 416, is not to be forwarded to a subsequent unit but will be processed locally. Also part of the control data (not shown as such) may be processed locally, e.g. when the target address matches a local unit address. The data handler DH controls the direct memory access unit to move the selected control data according to the buffer descriptors to the serial interface controller for being included in packets. The packets may be provided with a header indicating the respective target addresses, the length of the packet, the type of the packet, etc to comply with the sRIO protocol. Finally the packets are transferred by the serial interface controller.

Figure 5:
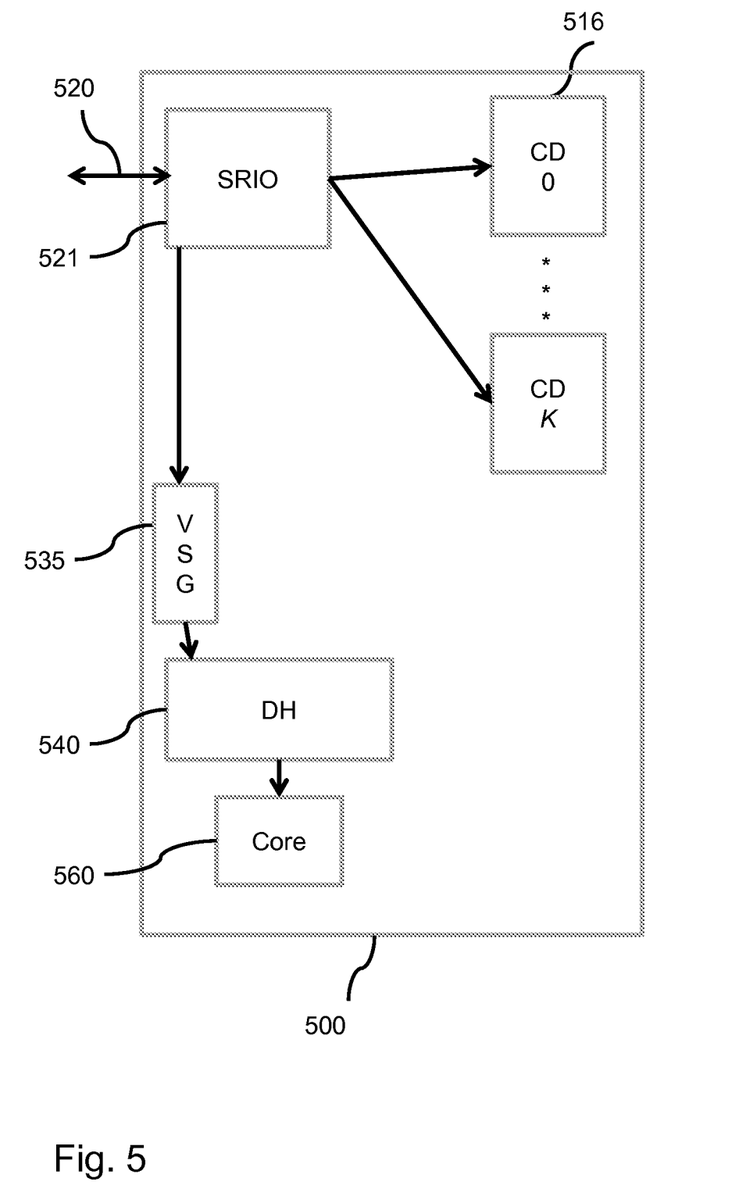
FIG. 5 shows an example of an uplink data flow in a device for a radio unit in an end-point setup.

FIG. 5 shows an example of an uplink data flow in a device for a unit in an end-point setup, for example a controller. The device 500 may also be used in an REC or RE as described above, and active parts are shown for elucidating the uplink data flow in a chain of radio units; the device being in an end position in the chain, e.g. coupled to a combination of a common public radio interface and a separate serial interface only on one side. In the example the device 500 has a serial interface controller 521 providing a separate serial interface SRIO 520 for exchanging packets with a preceding radio unit as indicated by an arrow. The device further has a data handler DH 540 coupled to the serial interface controller and, optionally, a further CPRI interface. The data handler controls the interfacing of the selected control data via the separate serial interface and may cooperate with a core processor 560. The data handler may also be implemented in a processor and embedded software. A virtual interrupt unit 535 is coupled to the serial data controller for receiving interrupt packets, and may generate an interrupt based on such packets to the data handler and/or the core processor for triggering the control data handing as indicated in said interrupt packets.

In the device, the data handler is arranged for configuring the serial interface controller to receive and select packets containing control data, e.g. based on a packet type and/or a target address indicated in a header. When the target address matches a local unit address, the control data are retrieved from the packets and stored in respective buffers 516 so as to enable processing of the control data. The data handler so receives an uplink data flow from the preceding radio unit, e.g. a networking radio unit shown in FIG. 4.

Figure 6:
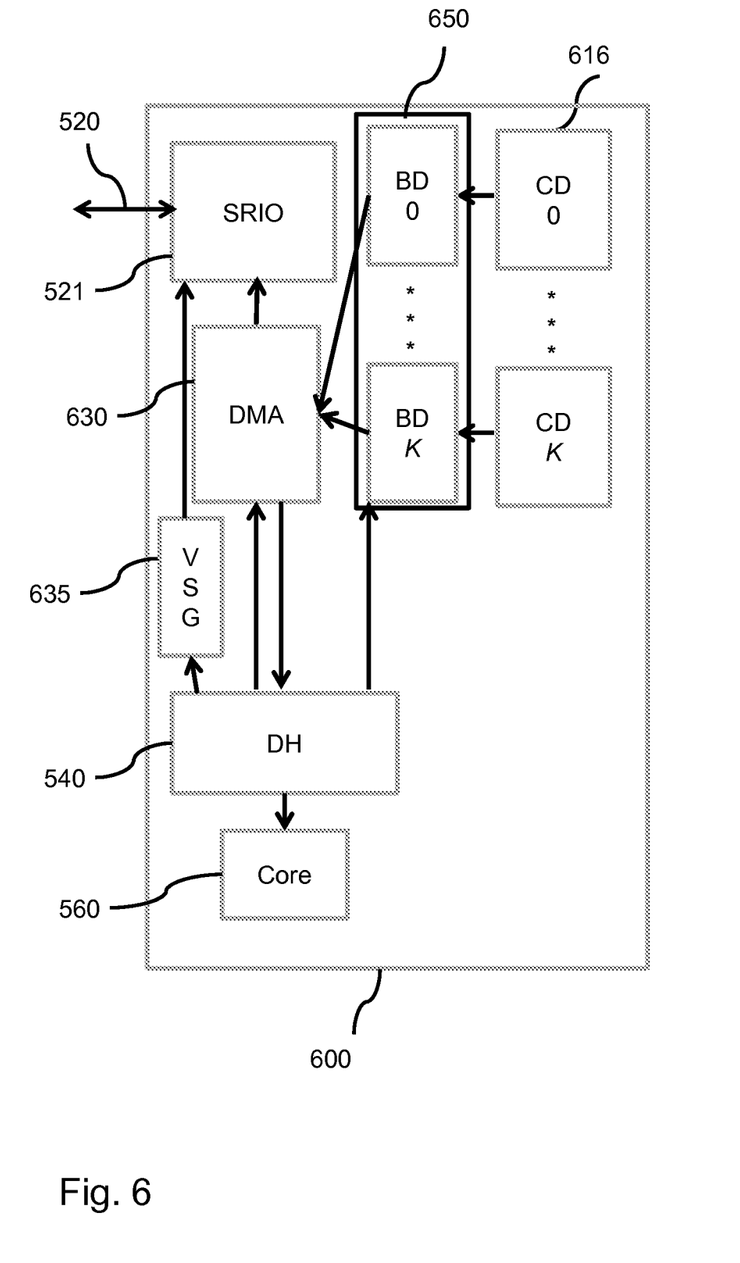
FIG. 6 shows an example of a downlink data flow in a device for a radio unit in an end-point setup.

FIG. 6 shows an example of a downlink data flow in a device for a unit in an end-point setup. The device 600 corresponds to the device shown in FIG. 5, may be used in a controller, an REC or RE, and active parts are shown for elucidating the downlink data flow in a chain of radio units. The device is in an end position in the chain, e.g. coupled to a serial interface only on one side. In the example the device 600 may additionally have a CPRI controller (not shown) providing a common public radio interface for streaming data samples. The device has a serial interface controller 521 providing a separate serial interface SRIO 520 for exchanging packets with a preceding radio unit as indicated by an arrow. The device further has a data handler DH 540 coupled to the serial interface controller and, optionally, the CPRI interface. The data handler controls the interfacing of the selected control data via the separate serial interface and may cooperate with a core processor 560. The data handler may also be implemented in a processor and embedded software.

In the device, the data handler is arranged for configuring the serial interface controller to transmit packets containing control data, e.g. including a packet type and/or target address indicated in a header. The control data are retrieved from data buffers 616, marked CD_0 to CD_K for a number of sets of selected control data as prepared by local processing similar to control data prepared to be transmitted via CPRI. The data handler so controls a downlink data flow to the preceding radio unit, e.g. a networking radio unit shown in FIG. 7. The device may have a virtual interrupt unit 635 coupled to the serial data controller for generating interrupt packets, and may generate an interrupt packet as instructed by the data handler and/or the core processor triggered by completion of the control data handing and/or processing for a number of lanes.

Figure 7:
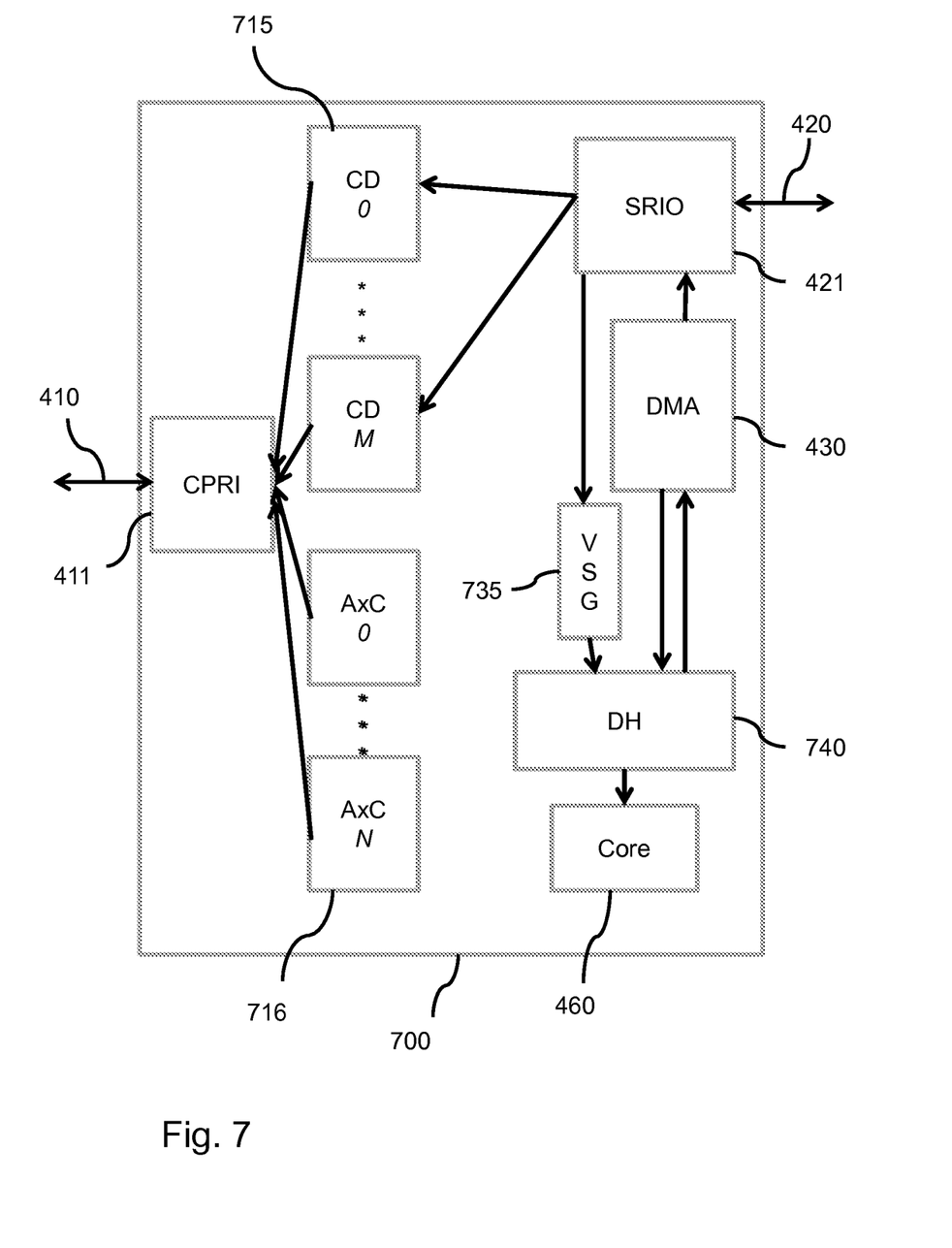
FIG. 7 shows an example of a downlink data flow in a device for a radio unit in a networking setup.

FIG. 7 shows an example of a downlink data flow in a device for a radio unit in a networking setup. The device 700 corresponds to the device shown in FIG. 4, may be used in an REC or RE, and active parts are shown for elucidating the downlink data flow in a chain of radio units; the device being in an intermediate networking position in the chain, i.e. coupled to a CPRI interface on one side and coupled to a separate serial interface on the other side. In the example the device 700, like the device shown in FIG. 4, has the CPRI controller 411 providing the common public radio interface CPRI 410, the serial interface controller 421 providing the separate serial interface SRIO 420, the direct memory access unit DMA 430. The device has a data handler DH 740 coupled to the direct memory access unit. The data handler controls the interfacing of the control data via the CPRI and separate serial interfaces, and may cooperate with the core processor 460. The data handler may also be implemented in a processor and embedded software.

In the device, the data handler is arranged to control the serial controller so as to receive the packets containing control data via the serial interface, and select packets containing control data to be streamed via CPRI, e.g. based on a packet type and/or a target address indicated in a header. When the target address matches target destination address, the control data are retrieved from the packets and stored in respective buffers 715 marked CD_0 to CD_M so as to enable streaming of the selected control data in respective lanes according to respective target destination address, i.e. similar to downlink control data arriving on the streaming CPRI. The target destination addresses may be assigned to respective lanes. Furthermore, data samples may be stored in data buffers 716, e.g. data samples from incoming lanes or data samples generated locally. The data handler so handles a downlink data flow to the preceding radio unit, e.g. a radio equipment unit not shown as such. The data handler DH may control the direct memory access unit to move the selected control data from the serial interface controller to the buffers for respective lanes according to the lane addresses included in packets. The device may have a virtual interrupt unit VSG 735 coupled to the serial data controller for receiving interrupt packets, and may generate an interrupt based on such packets to the data handler and/or the core processor for triggering the data handing and/or processing for a number of lanes as indicated in said interrupt packets.

In practice, the sRIO controller may get the packets and write them to the system memory according to their target destination address. After receiving all packets for the M destinations an interrupt may inform the data handler or core to initiate the CPRI interface to stream the selected control data. Subsequently, the device transmits a full set of N lanes and control data to the preceding radio unit, for example a radio equipment unit.

It is noted that the above control data buffers may be twice (or more) the size of the respective control data packets, to receive new packets while the previous set is still being transferred via CPRI.

It is noted that the data handler functions may be implemented in a processor by embedded software, or, at least partially, in hardware circuits. Also, the BD ring buffer management including the increment of buffer pointers may be may be implemented in a processor by embedded software, or, at least partially, in hardware circuits.

Optionally, the serial interface is a PCI express serial interface. The PCI Express (Peripheral Component Interconnect Express), is a well known high-speed serial computer expansion bus standard. The PCI data flow is similar to the flows described above, but with a PCI express Controller instead of the sRIO controller. The DMA control and the further flows are identical.

Figure 8:
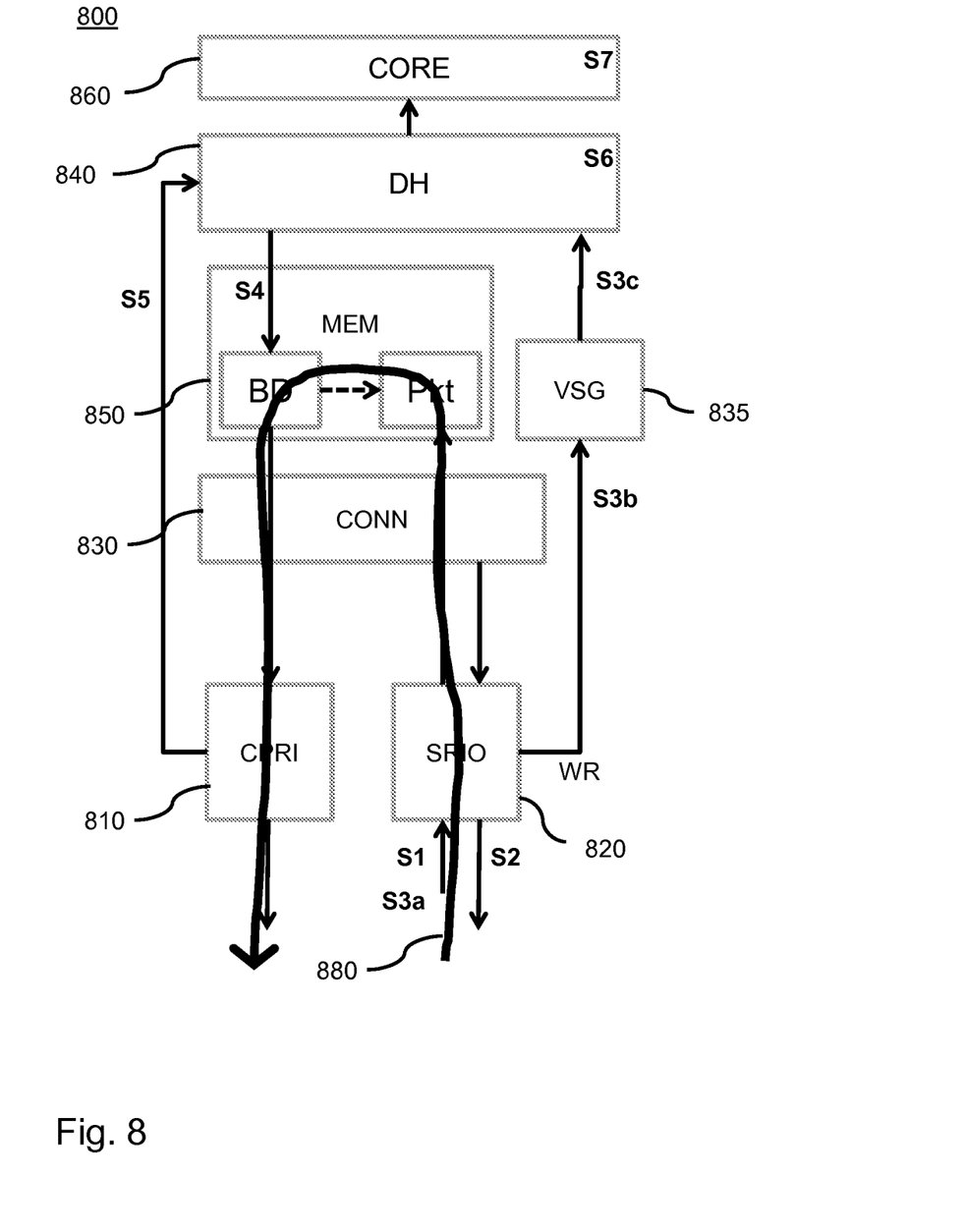
FIG. 8 shows an example of a control data flow from a separate serial interface to a common public radio interface.

FIG. 8 shows an example of a control data flow from a separate serial interface to a common public radio interface. The Figure schematically shows a data flow 880 in a device 800 corresponding to the devices as described with reference to FIG. 4 or 7. The device may be used in an REC or RE, and active parts are shown for elucidating the data flow 880 in the device being in an intermediate networking position in the chain, i.e. coupled to a CPRI interface on one side and coupled a separate serial interface on the other side. In the example the device 800 has a CPRI interface 810 providing the common public radio interface and a serial interface 820, and connection circuit 830, for example including a direct memory access unit, coupled to the CPRI and serial interface and a memory 850. The device has a data handler DH 840 for handling the control data flow and managing the contents of the memory 850. The data handler controls the interfacing of the control data via the CPRI and separate serial interfaces, and may cooperate with a core processor 860, e.g. for error handling. The data handler may also be implemented in a processor and embedded software.

Operationally, in the example, the converting of control data arriving on the serial interface in packets to streaming control data for the CPRI involves the following steps as indicated by arrows marked S1 to S7 in FIG. 8:

S1. The sRIO receives an Ethernet packet. This packet is written to a specific target memory address, indicated by the box PKT in the memory 850.

S2. The sRIO originator side waits for the response indicating that the data of the packet has been written to the memory. The response is generated by a local interconnect unit in the sRIO interface automatically to provide write confirm.

S3(a,b,c) The sRIO receives a virtual interrupt message which asserts, via an interrupt unit 835, an interrupt to the data handler or core performing the data handler function.

S4. The data handles matches the target address, e.g. if the MAC address matches the CPRI target, the Ethernet BD of the incoming control data is written to the CPRI BD ring (shown as box BD ring) in the memory and incrementing the BD ring write pointer in the CPRI. The data handler is in charge of writing the Ethernet BD, e.g. the field containing the packet size, and increments the BD ring write pointer afterward.

S5. The CPRI is sending the packet and generates an interrupt upon completion.

S6. The data handler or core manages the CPRI BD ring, i.e. how many packets are in the ring.

S7. In the case of overrun or underrun the core creates error message to be sent to the sRIO.

Figure 9:
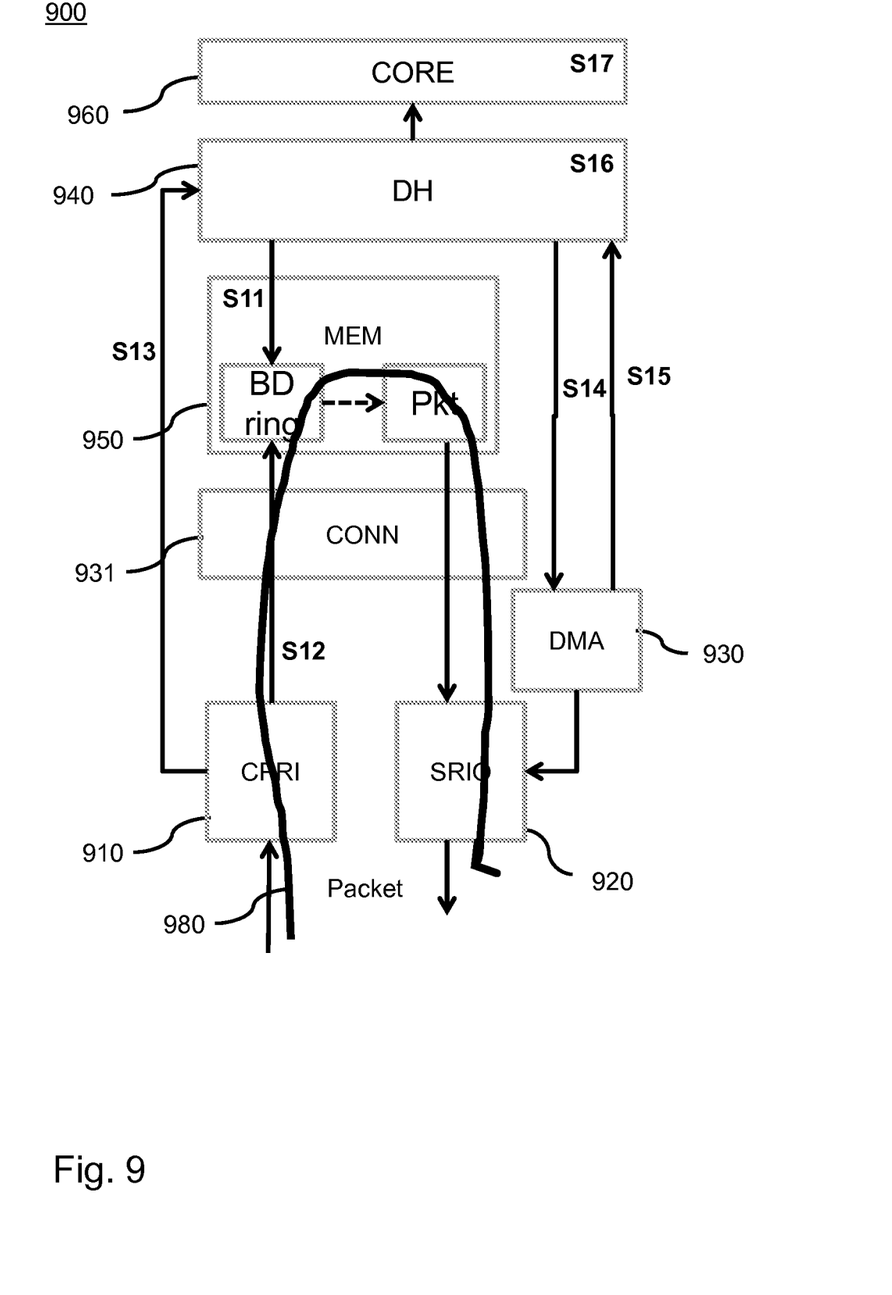
FIG. 9 shows an example of a control data flow from a common public radio interface to a separate serial interface.

FIG. 9 shows an example of a control data flow from a common public radio interface to a separate serial interface. The Figure schematically shows a data flow 980 in a device 900 corresponding to the devices as described with reference to FIG. 4 or 8. The device may be used in an REC or RE, and active parts are shown for elucidating the data flow 980 in the device being in an intermediate networking position in the chain, i.e. coupled to a CPRI interface on one side and coupled a separate serial interface on the other side. In the example the device 900 has a CPRI interface 910 providing the common public radio interface and a serial interface 920, and connection circuit 931 and a direct memory access unit 930, coupled to the CPRI and serial interface and a memory 950. The device has a data handler DH 940 for handling the control data flow and managing the contents of the memory 950. The data handler controls the interfacing of the control data via the CPRI and separate serial interfaces, and may cooperate with a core processor 960, e.g. for error handling. The data handler may also be implemented in a processor and embedded software.

Operationally, in the example, the converting of streaming control data arriving on the common public radio interface to the serial interface in packets involves the following steps as indicated by arrows marked S1 to S7 in FIG. 9:

S11. The data handler or core prepares empty BDs in the BD ring in memory. All the BDs of the ring are prepared in order to prevent a potential BD underrun. The BD ring write pointer is incremented for the CPRI, which indicates the number of BDs ready to be used. This is an initial configuration.

S12. The CPRI receives control data, e.g. formatted according to Ethernet through the C&M fast channel. The packet is written to a specific target memory address defined by the respective BD. The BD is updated with the packet size and status, for example an error indication.

S13. The CPRI is asserting an interrupt towards the core or data handler.

S14. The data handles matches the target address, e.g. if the MAC address matches the sRIO target, then the data handler is programming the DMA to send this packet. The sRIO is sending the packet.

S15. The data handler is waiting for response which asserts a DMA interrupt saying that the packet has been transmitted, The data handler need not wait until the packet arrives to the sRIO target.

S16. The data handler manages the CPRI BD ring, i.e. how many packets are in the ring). The core knows that this BD can be used again, i.e. the BD ring pointer is incremented.

S17. The core may handle errors. It is the responsibility of the higher level and/or end-points (RE, primary controller) to check if all the packets have arrived correctly, and if not, take care of resending them.

The above system could be used generally by radio communication stations built in a daisy chain topology (e.g. RECs and REs) where separate control data traffic for controlling radio units is required, or interrupt load for handling control data has to be reduced. In this case at least part of the control data can be forwarded through the sRIO interface. Moreover the above interfacing enables a seamless control data traffic bypass through a REC device from a CPRI interface (which is a data-stream protocol) to an sRIO interface (which is a packet based protocol) and vice versa. It enables an additional system connectivity where the radio unit is connected to an RE or Networking REC via CPRI on one hand and to a controller or further networking REC or End-Point REC via sRIo on the other hand.

The above interfacing method may be implemented in any radio unit in a chain in a base station. The device as described above with reference to FIGS. 4-7 may be a semiconductor device for a communication device, in the form of an integrated circuit. The IC may be a Field Programmable Gate Array (FPGA), a microcontroller including peripherals circuits, a digital signal processor (DSP), or a suitably programmed general purpose processor (GPP). Also, the device may be a radio unit comprising such a programmable processor, the programmable processor being arranged to execute a program code comprising instructions for causing the programmable processor to perform the method.

Optionally, the program code may be provided on a computer readable medium, also called a medium comprising a computer program product, the computer program product comprising instructions for causing a processor apparatus to perform the above interfacing method. The computer program product may further comprise instructions for causing a processor apparatus to perform other processing stages of the receive chain, such as frequency domain processing. The computer program product may be embodied on a computer readable medium as physical marks or by means of magnetization of the computer readable medium, e.g. an optical disc, a hard disk, solid state memory, flash memory, etc., and may be non-recordable or recordable.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices such as FPGA or units able to perform the desired device functions by operating in accordance with suitable program code. Furthermore, the devices may be physically distributed over a number of apparatuses, while functionally operating as a single device. Also, devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of interfacing in a base station in a mobile communication system, the base station comprising radio units and at least one controller unit for controlling the radio units, different types of the radio units including at least one radio equipment unit coupled to at least one antenna and at least one radio equipment controller unit for controlling the radio equipment unit, the radio units having a common public radio interface for streaming data samples and control data arranged in lanes corresponding to antenna signals and a serial interface for transferring packets separate from the common public radio interface, the method comprising:
- transferring, between a first radio unit and a further unit, selected control data arranged in packets via the serial interface, the selected control data corresponding to control data streamed between the first radio unit and a preceding radio unit via the common public radio interface;
- in the first radio unit, arranging in packets the selected control data to be transmitted via the serial interface to the further unit, bypassing processing of the control data in the first radio unit;
- receiving an interrupt packet by an interrupt unit in the first radio unit or the further unit, the interrupt unit triggering further processing of the selected control data upon receipt of the interrupt packet; and
- in the further unit, processing the selected control data arranged in packets received via the serial interface.

2. Method as claimed in claim 1, wherein said arranging in packets comprises
- retrieving a target address from the control data formatted on the common public radio interface according to a predetermined protocol;
- matching the target address to a target destination on the serial interface for selecting the control data, and, if selected,
- transmitting the packet having the selected control data via the serial interface, the packet comprising the target address.

3. Device for use in a radio unit, the radio unit including at least one radio equipment unit coupled to at least one antenna and at least one radio equipment controller unit for controlling the radio equipment unit, the device comprising: a common public radio interface for streaming data samples and control data arranged in lanes corresponding to antenna signals and a serial interface for transferring packets separate from the common public radio interface, the device being configured for
- transferring, between the device and a further unit, selected control data arranged in packets via the serial interface, the selected control data corresponding to control data streamed between the device and a preceding radio unit via the common public radio interface, the device comprising
- a data handler arranged for arranging in packets the selected control data to be transmitted via the serial interface to the further unit, bypassing processing of the streamed control data in the device, and
- an interrupt unit for triggering further processing of the selected control data upon receipt of an interrupt packet.

4. Device as claimed in claim 3, wherein the data handler is configured for said arranging in packets by
- retrieving a target address from the control data formatted on the common public radio interface according to a predetermined protocol,
- matching the target address to a target destination on the serial interface for selecting the control data, and, if selected,
- transmitting the packet having the selected control data via the serial interface, the packet comprising the target address.

5. Device as claimed in claim 4, wherein the target address is a Media Access Control address.

6. Device as claimed in claim 3, wherein the data handler is configured for said arranging in packets by storing the selected control data in the memory according to a buffer descriptor and for retrieving the selected control data from the memory to the serial interface according to the buffer descriptor.

7. Device as claimed in claim 3, wherein the data handler is configured for maintaining a ring memory for storing buffer descriptors for respective data buffers, the sequence of stored buffer descriptors in the ring memory corresponding to sets of control data to be transferred as packets.

8. Device as claimed claim 7, wherein the device is arranged for preparing the ring memory by creating a number of empty buffer descriptors for receiving the selected control data from the common public radio interface.

9. Device as claimed in claim 3, wherein
- the device comprises a direct memory access unit for directly accessing data in a memory,
- the data handler is configured for storing selected control data in the memory according to a buffer descriptor and providing the buffer descriptor to the direct memory access unit, and
- the direct memory access unit is configured for transferring the selected control data from the memory to the serial interface according to the buffer descriptor or, vice versa, transferring the selected control data from the serial interface to the memory.

10. Device as claimed in claim 3, wherein the data handler is configured for said arranging in lanes by
- retrieving from the packets received via the serial interface a target address,
- matching the target address to a target destination on the common public radio interface for selecting the control data, and, if selected,
- transmitting the selected control data via a respective lane determined according to the target address and formatted on the common public radio interface according to a predetermined protocol, or
- maintaining a local unit address as the target destination address and, if the target address matches the local unit address, locally processing the selected control data.

11. Device as claimed in claim 3, wherein the data handler is arranged for transferring a predetermined amount of the selected control data arranged in packets via the serial interface, and for generating and transferring via the serial interface an interrupt packet after transferring said predetermined amount.

12. Device as claimed in claim 3, wherein the device is configured for transferring data samples of N lanes to the preceding radio unit via the common public radio interface, the interrupt packet indicative of transferring, by the preceding radio unit, the selected control data corresponding to a predetermined amount of the data samples of the N lanes.

13. Device as claimed in claim 3, wherein the serial interface comprises a serial interface controller arranged for formatting control data in packets to be transmitted, and for retrieving control data from packets as received.

14. Device as claimed in claim 13, wherein the serial interface is according to the Serial Rapid Input Output standard, or the Peripheral Component Interconnect Express standard.

15. Radio equipment controller unit for a base station in a mobile communication system, the radio equipment controller unit comprising the device according to claim 3.

16. Radio equipment unit for a base station in a mobile communication system, the radio equipment unit comprising the device according to claim 3.

17. Integrated circuit comprising the device according to claim 3.

* * * * *